United States Patent

Arnold

[11] Patent Number: 6,125,118
[45] Date of Patent: Sep. 26, 2000

[54] ATM LOCAL ACCESS

[75] Inventor: John S Arnold, Nether Heyford, United Kingdom

[73] Assignee: Marconi Communications Limited, United Kingdom

[21] Appl. No.: 08/973,727

[22] PCT Filed: Jun. 5, 1996

[86] PCT No.: PCT/GB96/01338

§ 371 Date: Dec. 5, 1997

§ 102(e) Date: Dec. 5, 1997

[87] PCT Pub. No.: WO97/00583

PCT Pub. Date: Jan. 3, 1997

[30] Foreign Application Priority Data

Jun. 10, 1995 [GB] United Kingdom .................... 9511844

[51] Int. Cl.[7] .............................. H04L 12/28; H04L 12/56
[52] U.S. Cl. ............................................ 370/397; 370/401
[58] Field of Search .................................. 370/397, 229,
370/235, 285, 321, 326, 345, 360, 389,
392, 396, 395, 398, 399, 400, 401, 404,
409, 340, 347, 349, 394, 403, 402, 405,
406

[56] References Cited

U.S. PATENT DOCUMENTS

| 5,513,178 | 4/1996 | Tanaka ..................................... 370/395 |
| 5,519,689 | 5/1996 | Kim ......................................... 370/232 |
| 5,629,928 | 5/1997 | Calvignac et al. ....................... 370/412 |
| 5,689,499 | 11/1997 | Hullett et al. ........................... 370/235 |
| 5,696,764 | 12/1997 | Soumiya et al. ......................... 370/395 |
| 5,896,371 | 4/1999 | Kobayashi et al. ..................... 370/232 |

OTHER PUBLICATIONS

Computer Networks And ISND Systems, vol. 26, No. 6/08, Mar. 1, 1994, pp. 831–840, As Van H.R., et al., CRMS=II: A Mac Protocol for Ring–Based GB/S Lans And Mans.

Computer Networks And ISDN Systems, vol. 26, No. 6/08, Mar. 1, 1994, pp. 785–798, Kazuo Imai, et al., ATMR: Asynchronous Transfer Mode Ring Protocol, pp. 786–787.

Proceedings Of The Region Ten Conference (TENCON), Beijing, Oct. 198–21, 1993, col. 3 of 5, Oct. 19, 1993, Yuan Baozong, pp. 232–236, Byung Chun Jeon, et al., A Gigabit ATM–Lan Protocol for Multimedia Communications, pp. 232–234.

*Primary Examiner*—Dang Ton
*Assistant Examiner*—Phirin Sam
*Attorney, Agent, or Firm*—Kirschstein, et al.

[57] ABSTRACT

In a Telecommunications Infrastructure, an Access Network or Segment of an Access-Layer Infrastructure has a plurality of subscribers or extensions linked to one or more gateways having ports and providing access to/from higher network layers. The linking from the subscribers or extensions to the gateways is carried out by the statistical-multiplexing of ATM cells carried in time-slots formatted onto broadband bearers. A desired gateway is identified by a number carried in the Virtual-Path Identifier field of each ATM cell. The source is identified by a number carried in an additional address field external to the ATM cell but internal to the time-slot. The linking from the gateways to the subscribers or extensions is via a distribution switch. The desired subscriber is identified by the number carried in the additional address field and the source is identified by the number carried in the Virtual Path Identifier field of the cell.

7 Claims, 4 Drawing Sheets

Fig.2a(ii).

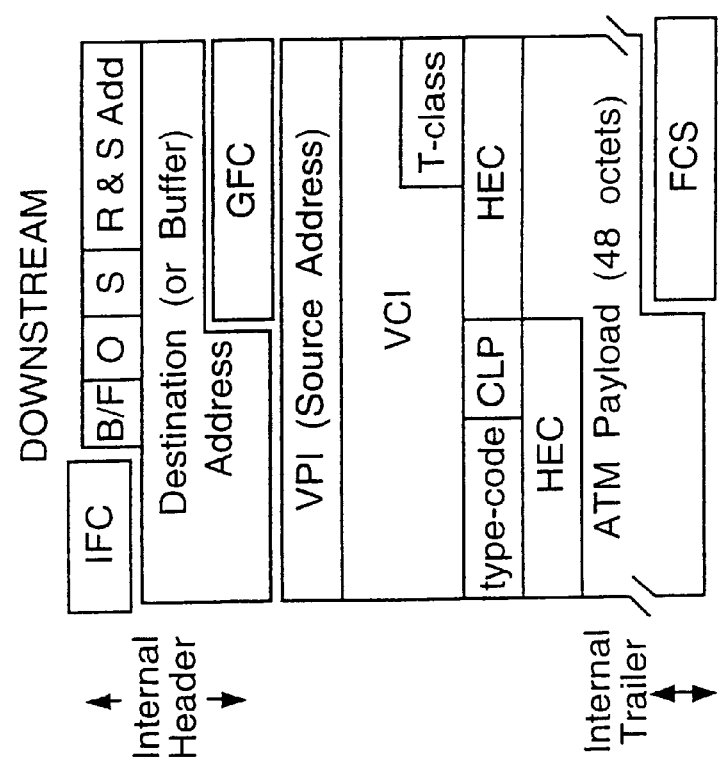
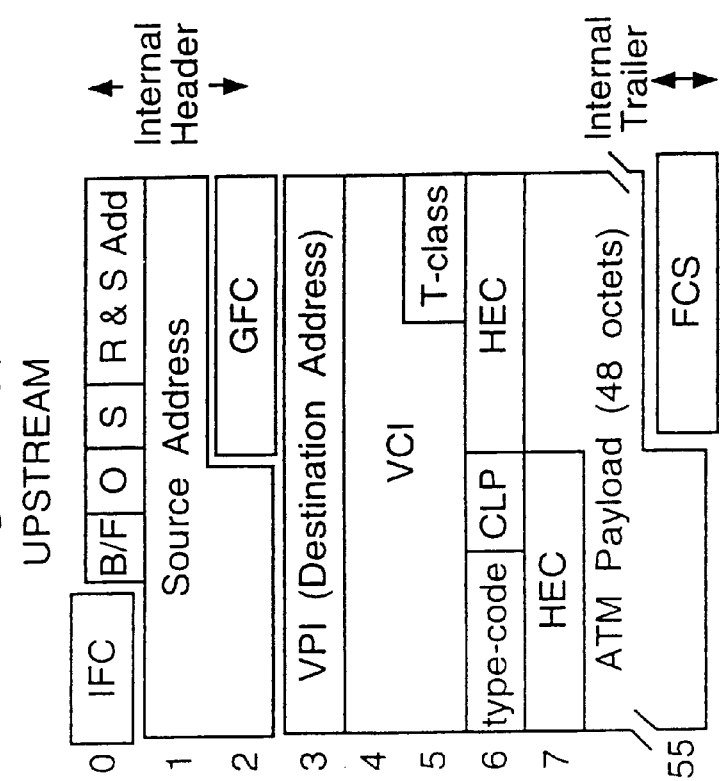

ATM LOCAL ACCESS

BACKGROUND OF THE INVENTION

The Telecommunications Infrastructure has structure resulting from fundamental differences between its three component parts—the Access Infrastructure which provides connection to users, the Switching Infrastructure which provides dynamic handling of communication entities (e.g. "calls") and the Transport Infrastructure which interconnects geographically separated segments.

Telecommunications Networks are logical entities mapped onto the infrastructure, illustrated in FIG. 1. A Network can be of any size and may be "bent" into any shape but is limited by the infrastructure: in particular no discontinuities are permissible, which may be interpreted as meaning that the only acceptable topologies are those which will map retrospectively onto the existing infrastructure.

Aspects of a design for a segment of the access layer of an Asynchronous Transfer Mode (ATM) infrastructure conforming to the above definition are described.

SUMMARY OF THE INVENTION

According to the present invention there is provided an ATM Access Network or Segment of an Access-Layer Infrastructure comprising a plurality of subscribers or extensions linked to one or more gateways having ports providing access to/from higher network layers where the linking from the subscribers or extensions to the gateways is by the statistical-multiplexing of ATM cells carried in time-slots formatted onto broadband bearers where a desired gateway is identified by a number carried in the Virtual-Path Identifier field of each ATM cell and the source is identified by a number carried in an additional address field external to the ATM cell but internal to the time-slot, the linking from the gateways to the subscribers or extensions being by means of a distribution switch where the desired subscriber is identified by the number carried in the additional address field and the source is identified by the number carried in the Virtual Path Identifier field of the cell.

BRIEF DESCRIPTION OF THE DRAWINGS

The present invention will now be described, by way of example, with reference to the accompanying drawings, in which;

FIGS. 2b(i) and 2b(ii) show the upstream and downstream Access-Segment Slot formats respectively for the subscriber interface;

DETAILED DESCRIPTION OF THE PREFERRED EMBODIMENTS

Figure 1:
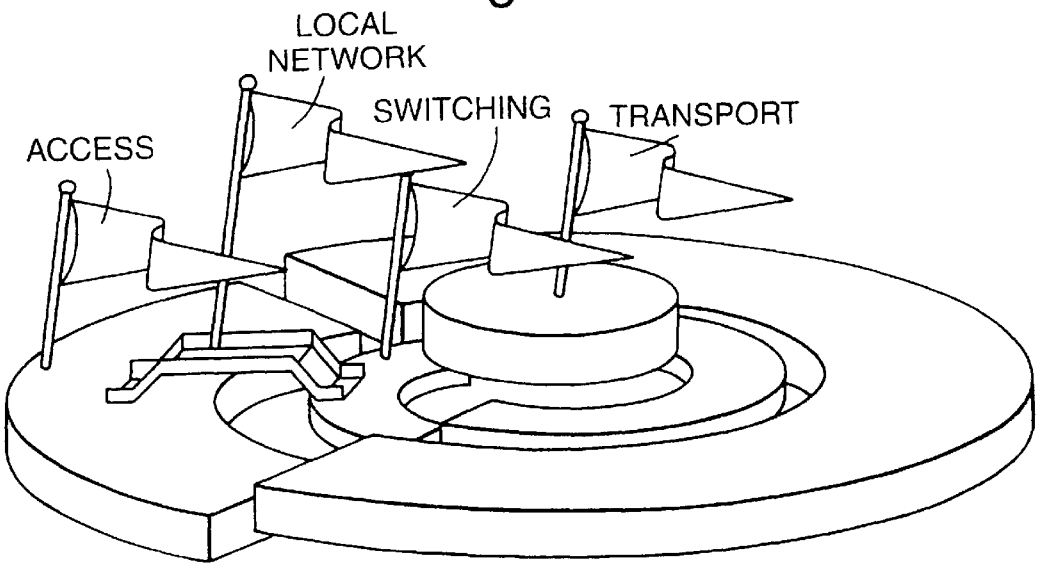
FIG. 1 is a pictorial illustration of a Telecommunications Infrastructure.

The two most basic requirements of the access infrastructure are concentration and grooming.

Paths and channels through an ATM network are carried on tracks. A track will only occupy bandwith on the network bearers when it is carrying information; thus the track of a path or channel is a virtual entity which has real existence only when carrying information.

Therefore, within the limits of the fixed-size Virtual-Path and Virtual-Channel address fields carried in the ATM cell header (VPI and VCI fields), it is possible within one segment of an access infrastructure to define permanent virtual-tracks between all of the subscribers and one or more gateways into the upstream switching layer.

Concentration is provided in the upstream direction by statistically-multiplexing the multiplicity of sources onto a single bearer of bandwidth compatible with a good quality-of-service and expected usage. Distribution is provided in the downstream direction by addressing source information to the virtual-track of the required subscriber.

Grooming is provided by the subscriber addressing one of a choice of virtual-tracks accessing two or more separate gateways. Each gateway in a segment of the access infrastructure with a single higher-level network or service on the upstream side and with a group of subscribers within the segment on the downstream side.

The preferred access-segment design would be capable of being distributed over a significant geographical area.

There are two basic ways of handling the links between subscribers and gateways:

1) By the association of access connections with calls using connection-mode addressing and the VCI field.

The chosen VCI value must be unique within the segment for each connection, thereby implicity identifying the source (subscriber or gateway) and the destination (gateway or subscriber).

Whilst this may be regarded by some as the conventional solution to the problem it has an important disadvantage in the access segment.

Each gateway owns its own Call-Processing Subsystem (CPS). Since the VCI must be unique within the segment, separate and otherwise independent gateways must collaborate to choose a unique VCI value.

Alternately, one gateway is given the responsibility for establishing all connections in the segment; even those between a subscriber and a gateway which may belong to a competing operator; a solution which is obviously unsatisfactory to everybody except the legal profession requiring, as it does, the enforcement of fair access by law.

To solve the above problem the segment may own its own CPS, having signalling links to all gateways. This is the most satisfactory solution of those described thus far but will add significantly to the cost.

2) By the association of each gateway with a unique and permanent VPI value which might be regarded as the ATM equivalent to the dialed prefix used to access networks and services in the existing voice network.

By this means a permanent Virtual Path is established between each subscriber and each gateway. A virtual channel is passed transparentlyalong the path for communication between subscriber and gateway.

This is the solution which is preferred because of its simplicity in control and management. However whilst the VPI field identifies the gateway, both ends must be identified to define the virtual-track. A solution to this problem is described below.

Note that with this solution duplication of a VCI value on tracks to different gateways causes no problems; thus, no co-ordination between gateways is necessary.

Figure 2A:
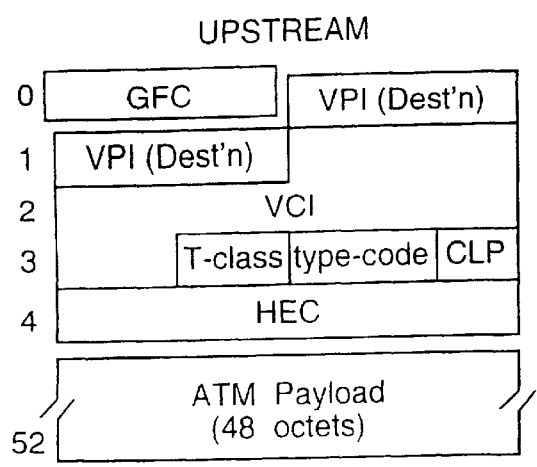
FIGS. 2a(i) and 2a(ii) show the upstream and downstream Access-Segment User-Network Interface (UNI) formats respectively for the subscriber interface.
Figure 2A:
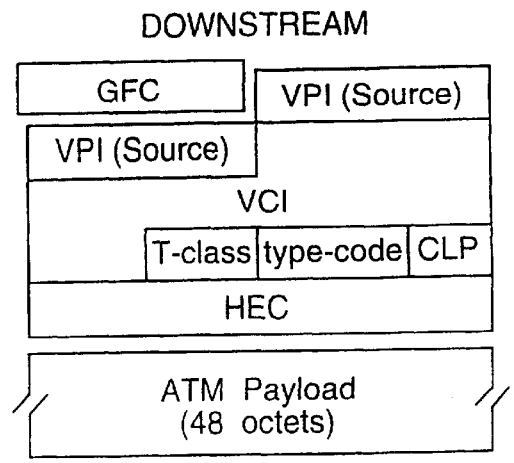

The subscriber interface is the User-Network Interface (UNI) formatted as in FIG. 2a.

Note that the VPI field carries the gateway address as the destination for the cell in the upstream direction and as the source in the downstream direction, thus conforming to the ITU-recommendation I.150/3.1.4.1 that "the same (VPI) value is assigned for both directions of transmission".

Within the access-segment the cell is carried in a slot, encapsulated between an internal header and an internal trailer, shown in FIG. 2b.

The chosen slot size is 56 octets which gives the smallest overhead able to carry the additional information needed. Also. a high-speed node is limited in capacity principally by memory cycle-time in interface buffers implying the need for a relatively large word-length. By choosing a slot size which is an integer multiple of 8 octets a buffer word-length of 32 or 64 bits is possible without the added expense of a re-timing circuit.

Included in the internal-header is a 12-bit subscriber identity field which carries the source address in the upstream direction and the destination address in the downstream direction. These values are inserted/removed within the line interface circuit on the downstream side of the access-segment and within each gateway on the upstream side.

Connections in the access-segment are always routed on the destination address which is carried in the VPI field of the encapsulated cell in the upstream direction, but in the internal-header of the slot in the downstream direction. At a routing switch within the access-segment the direction may not be implicit; thus a 1-bit field in the header is needed to identify the direction, and hence locate the destination address (shown as "0" for upstream and "1" for downstream in FIG. 2b). A slot may be occupied by a cell (busy) or unoccupied (free), identified by the B/F bit.

Asynchronous Transfer Mode (ATM) is the technology chosen by the international standards bodies for broadband networks. The primary transmission medium for broadband networks is optical fibre, and the state-of-the-art standards for optical fibre transmission are based on the Synchronous Digital Hierarchy (SDH).

The SDH makes ready provision for adding and dropping bandwidth at intermediate points on a fibre link. This ability is currently used to provide time-division-multiplexed (TDM) access for traditional 64 kbit/s telephony services on "primary-rate" (1.5 or 2 Mbit/s) bearers linking to remote or co-located multiplexers; bearers which are connected on the upstream side to central concentrators. Some tens of thousands of Advanced-Digital-Multiplexers (ADM's) providing this service are already installed around the world.

ATM uses statistical-multiplexing to provide the equivalent to concentration and the larger the bearer bandwidth and number of subscribers served the more efficient is the operation. In order to efficiently collect this large number of subscriber broadband channels into one access segment distributed statistical-multiplexing is necessary.

Broadband is a new service which does not yet have an established market. The solution described is based upon retrospective enhancement of the SDH Advanced Digital Multiplexer (ADM) so that ATM broadband services need only be added by an operator when and where a commercially viable case can be made.

Figure 3:
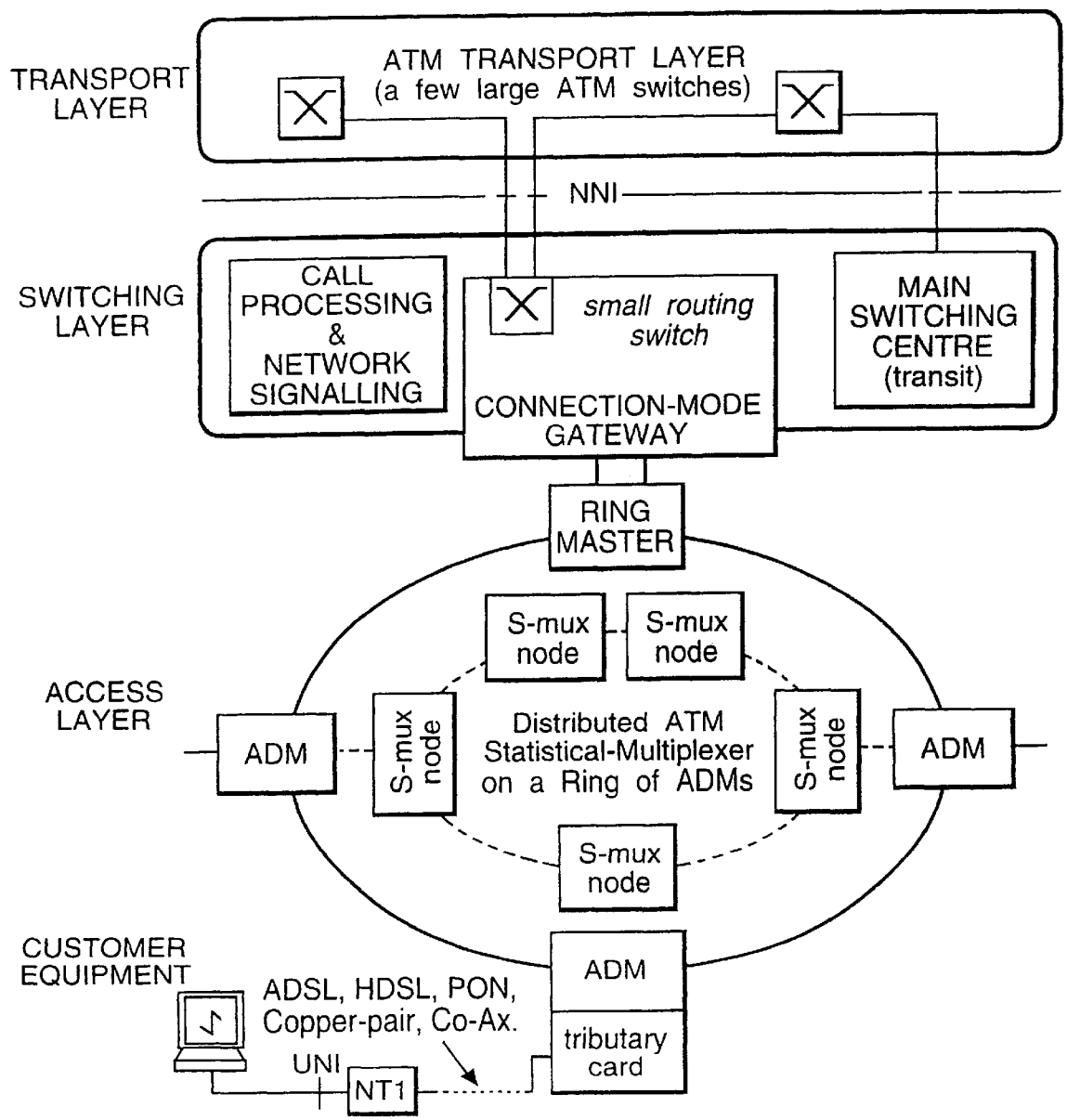
FIG. 3 shows a diagrammatic model of an ATM infrastructure.

A model of the ATM infrastructure is shown in FIG. 3 with a ring structure of ADM's providing a distributed ATM service in the access layer.

Figure 4:
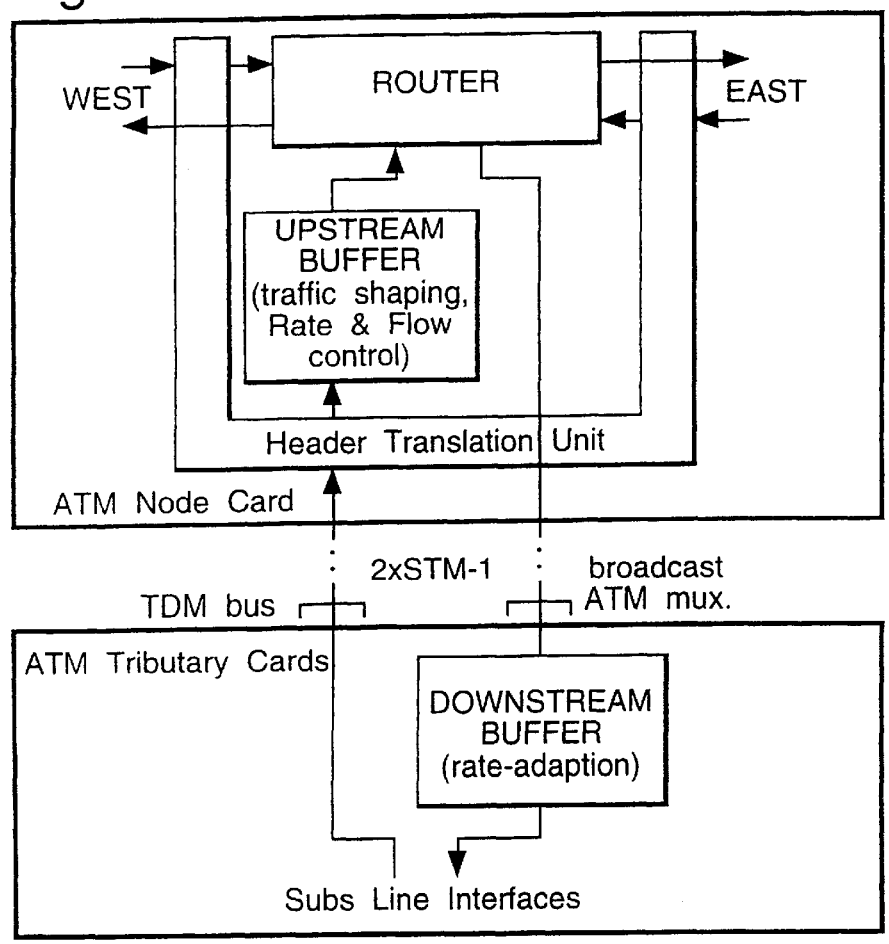
FIG. 4 shows diagrammatically an ATM access node for the present invention.

ATM access on an Advanced Digital Multiplexer will be implemented with an ATM Node card and one or more Tributary cards of several types. For the example shown the bandwidth of the link between Node and Tributary cards is about 300 Mbit/s (i.e. twice the SDH STM-1 rate) with broadcast ATM in the downstream direction and programmable Time-Division-Multiplexed cell-slots in the upstream direction, as illustrated in FIG. 4.

Figure 5:
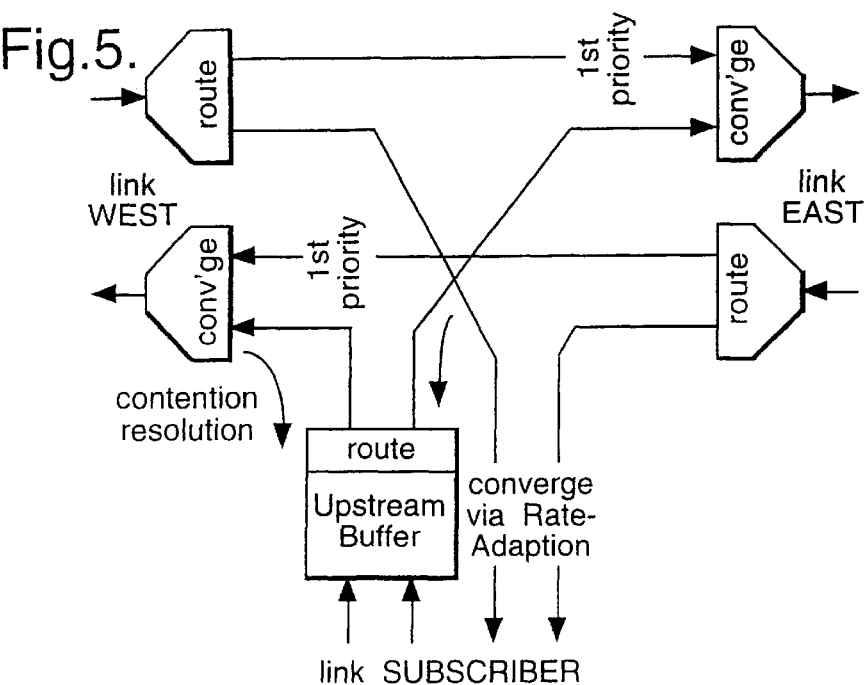
FIG. 5 shows a diagrammatic representation of a router for the present invention.

Statistical-multiplexing of the subscriber's served by the ring of ADM's forming a segment of the ATM access infrastructure is performed in two stages:
  i. Each individual ADM provides statistical-multiplexing for the group of subscribers it serves.
  ii. Each ADM contains an ATM routing-switch which is chain-linked to adjacent ADM's using a common SDH bearer to form a topological ring.
    The routing-switch shown in FIG. 5 provides through access and tributary access in clockwise and counter-clockwise directions on the ring. Through traffic has priority over converging local traffic and therefore is not subjected to any queuing delay.

The effect of giving priority to the through links (E/W and W/E) of the routine!-switch is that the most distant subscribers in the chain get preferred treatment. Fairness is re-established by credit-based flow-control using the Internal Flow-Control (IFC) channel.

The subscriber group at a node in the chain (normally one node per ADM) is allocated a default number of credits by a credit manager, a number which is proportional to the summed service-bandwidth contracted by members of the group.

Subscriber's service-bandwidth is allocated at contract time and is analogous to channel-capacity on the access link for narrowband services, e.g. primary-rate (30 time-slots), partial primary-rate, ISDN basic rate (2B+D), etc. For ATM the service-bandwidth may be any value up to the bandwidth of the physical bearer (and would be charged accordingly).

The service-bandwidth is defined by two terms, the peak-rate which is restricted by a time-division slot-interleaved multiplex in the upstream direction between the line interfaces and the common buffer which interfaces to the routing-switch, and the short-term mean rate which is averaged over a period commensurate with the size of the common buffer.

There is no restriction in the access segment on the duration of connections and the number of established virtual-channels—this is a responsibility of the control and management systems in the switching-layer above the access-layer. The policing of established virtual-channels is a responsibility of the gateway.

For each cell transmitted upstream one credit is debited from the node account.

The Flow-Controller will broadcast a RESET indication periodically on the Internal Flow-Control (IFC) channel and recognition of this indication at a node will restore the default credit.

If all credits are used before a RESET indication the result is that the traffic-shaping triggers of the distribution-shaper are incrementally raised up the buffer, just as action on Resource Management cells avoids congestion in the core network and with the same effect—the rate from the buffer is reduced. This rather roundabout method of controlling the flow from individual nodes avoids the bursts of traffic on the ring bearer at each RESET that would result from more direct control.

Each node is thereby allocated a share of the bearer bandwidth proportional to its credit allocation, and hence to the mean of the summed service bandwidths.

The summation of default credits for all nodes in the chain at the nominal RESET-rate defines the bandwidth capacity of the bearer. However, this assumes that all users are simultaneously originating traffic in proportion to their service-bandwidths which will rarely be the case. The more usual situation will be that some subscribers are inactive and others are highly active. For this case the nominal reset rate may result in active subscribers not gaining access because their node's credits have been spent, but at a time when there is spare capacity in the chain owing to inactivity at other nodes. To avoid this happening the Flow-Controller will monitor occupancy on the bearer at all nodes in the chain and, if activity is low at all nodes, the interval between RESET's will be reduced so permitting very active subscribers to utilise a larger proportion of the chain bandwidth. Similarly, when activity is excessively high the interval between resets will be increased.

Internal Flow-Control (IFC) uses the first two bits transmitted of the internal slot to form clockwise and anti-clockwise channels which are independent of cells. Somewhere along this channel are the clockwise and anti-clockwise Flow-Controllers; these are the only units which interrupt the IFC channel.

The codes carried in the IFC channel are as follows (left is the first bit transmitted):

| | |
|---|---|
| 00 | low occupancy (below lower limit) |
| 01 | hold (occupancy between limits) |
| 10 | high occupancy (above upper limit) |
| 11 | RESET |

These codes are specifically chosen to permit change "on-the-fly" without introducing delay. AR nodes have the responsibility for setting the first three codes according to the occupancy of the upstream shared buffer; each code will overwrite all code values below it. The RESET indication is set by the Flow-Controller for transmission in the reverse direction and is broadcast to all nodes. Note that the clockwise controller will pass the anti-clockwise IFC channel without change; similarly, the anti-clockwise Controller will pass the clockwise IFC channel. This implies that the same IFC channel needs to carry all four states (i.e. the first three states for one controller and the fourth state for the other).

The IFC channel originates from the Flow-Controller with the 00 value in each slot (when not carrying a RESET).

The IFC channel is received by the Flow-Controller after completing a loop around the nodes and:

For each IFC slot carrying the "high activity" indication (10) the interval between RESETS is increased by one increment.

For each IFC slot carrying the "hold" indication (01) no action is taken.

For each IFC slot carrying the "low activity" indication (00) the interval between RESETS is reduced by one increment.

If just one node in the chain is finding a high load on the bearer then all passing IFC slots will be set to the "high-activity" state until the load is reduced below the trigger level.

Only if all the nodes in the chain find a low load on the bearer will the "low-activity" state be received at the Flow-Controller.

This mechanism should ensure that a balanced load is maintained on the bearer with equal opportunity for all, that is "fairness" is established.

I claims:

1. An asynchronous transfer mode (ATM) access network or segment of an access-layer infrastructure, comprising:

a plurality of subscribers or extensions linked to one or more gateways having ports and providing access to and from higher network layers, said subscribers or extensions being linked to the gateways by statistical-multiplexing, of ATM cells carried in time-slots formatted onto broadband bearers, a desired gateway being identified by a number carried in a virtual-path identifier (VPI) field of each ATM cell, a source being identified by a number carried in an additional address field external to the ATM cell but internal to the time-slot, said gateways being linked to the subscribers or extensions by means of a distribution switch, a desired subscriber being identified by the number carried in the additional address field, the source being identified by the number carried in the VPI field of the respective ATM cell, each ATM cell having a user-network interface format with the VPI field having eight bits, and the additional address field having a greater size than the VPI field, thereby permitting the number of subscribers or extensions served to be greater than the size that the VPI field would permit.

2. The ATM access network or segment of the access-layer infrastructure as claimed in claim 1, wherein the number carried in the VPI field represents an address for the desired gateway and is a subset of the number carried in the additional address field representing an address for the source, and wherein a first of the gateway ports communicates with a second of the gateway ports where the second gateway port appears to the first gateway port as a subscriber or extension.

3. An asynchronous transfer mode (ATM) access network or segment of an access-layer infrastructure, comprising:

a plurality of subscribers or extensions linked to one or more gateways having ports and providing access to and from higher network layers, said subscribers or extensions being linked to the gateways by statistical-multiplexing of ATM cells carried in time-slots formatted onto broadband bearers, a desired gateway being identified by a number carried in a virtual-path identifier (VPI) field of each ATM cell, a source being identified by a number carried in an additional address field external to the ATM cell but internal to the time-slot, said gateways being linked to the subscribers or extensions by means of a distribution switch, a desired subscriber being identified by the number carried in the additional address field, the source being identified by the number carried in the VPI field of the respective ATM cell, the subscribers or extensions and the gateways being distributed across a number of nodes which are chain-linked in a chain by a slotted high-bandwidth bi-directional bearer forming a topological ring, a switch being arranged to link the chain across each node, through connected traffic having a first priority of access, a first-in-first-out (FIFO) queue being provided where converging local traffic must wait for slots marked as free on the high-bandwidth bearer, and means for copying the content of a busy time-slot, addressed to one of a subscriber, extension and gateway port connected to a particular node, to a buffer at the particular node, and for marking the busy time-slot as free.

4. The ATM access network or segment of the access-layer infrastructure as claimed in claim 3, wherein each time-slot also comprises an internal flow-control (IFC) field, at least two-bits in length, external to the ATM cell but internal to the time-slot, and wherein the IFC fields in successive time-slots form a pair of contra-rotating IFC-channels where, at an arbitrary point, each of the IFC-channels passes through an independent IFC-controller, and wherein the IFC field has at least three states for indicating the heaviest traffic load experienced at any node in the path of, and in the same direction as, the IFC-channel, and wherein the states are low occupancy, medium occupancy and high occupancy, and wherein an existing state of the IFC field is overwritten with an indication, if present, of an occupancy higher than that of the existing state unless the state is a fourth state for providing a reset indication for the respective contra-rotating IFC-channel; and wherein a first one of the IFC-controllers is operative to receive load states carried in the IFC field of time-slots on a first channel and to pass the reset indication originated by the IFC-controller of the contra-rotating IFC-channel thereby broadcasting the reset indication to all the nodes in the ring; and wherein the IFC-controller of the contra-rotating IFC-channel is operative to accept load states carried in the IFC field of time-slots on the contra-rotating IFC-channel and to pass the reset indication originated by the IFC-controller of the first channel thereby broadcasting the reset indication to all the nodes in the ring.

5. The ATM access network or segment of the access-layer infrastructure as claimed in claim 4, and means for allocating credits to each node, including a credit-manager for each direction of transmission on the ring, the credit allocation being in proportion to the summed mean bandwidth allocated in the service contracts to all subscribers, extensions or gateways by that node; the allocating means being operative to decrement an allocated credit count by one for each ATM cell transmitted in an upstream direction, to restrict or stop the transmission of ATM cells if the credit count is zero, and to restore the credit count to an original allocated value on receipt of the reset indication on the IFC-channel associated with said direction of transmission.

6. An ATM access network or segment of an access-layer infrastructure, comprising:

a plurality of subscribers or extensions linked to one or more gateways having ports and providing access to and from higher network layers, said subscribers or extensions being linked to the gateways by statistical-multiplexing of ATM cells carried in time-slots formatted onto broadband bearers, a desired gateway being identified by a number carried in a virtual-path identifier (VPI) field of each ATM cell, a source being identified by a number carried in an additional address field external to the ATM cell but internal to the time-slot, said gateways being linked to the subscribers or extensions by means of a distribution switch, a desired subscriber being identified by the number carried in the additional address field, and the source being identified by the number carried in the VPI field of the respective ATM cell.

7. The ATM access network or segment of the access-layer infrastructure as claimed in claim 6, wherein the subscribers or extensions and the gateways are distributed across a number of nodes which are chain-linked in a chain by a slotted high-bandwidth bi-directional bearer forming a topological ring, and wherein a switch is arranged to link the chain across each node, and wherein through connected traffic has a first priority of access, and wherein a first-in-first-out (FIFO) queue is provided where converging local traffic must wait for slots marked as free on the high-bandwidth bearer.

* * * * *